Figure 1:
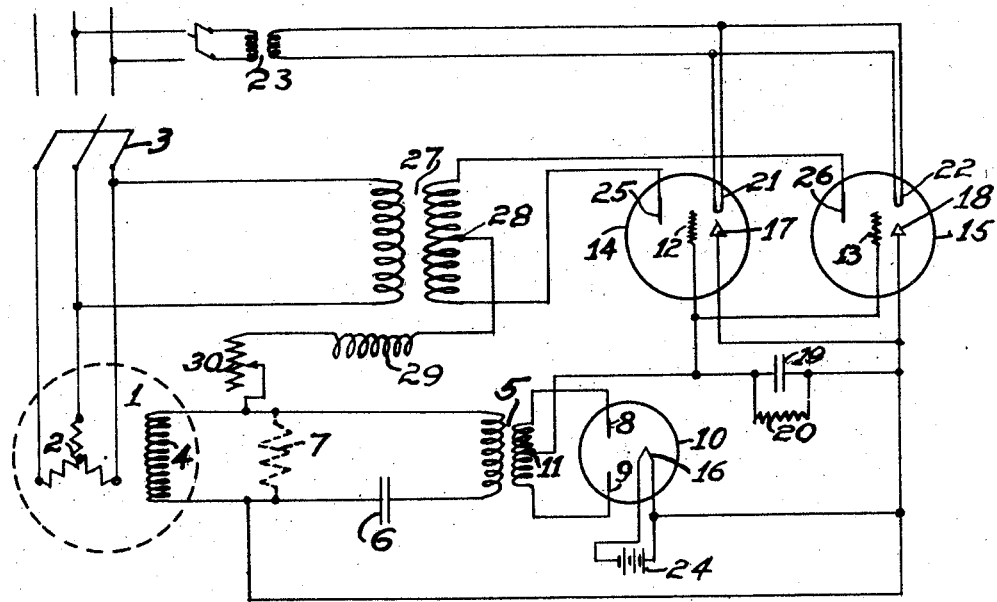

Inventor.
Joseph Arthur Balmford

Patented Feb. 15, 1938

2,108,038

UNITED STATES PATENT OFFICE 2,108,038

SYNCHRONIZING ALTERNATING CURRENT MOTOR

Joseph Arthur Balmford, East Orange, N. J.

Application November 14, 1933, Serial No. 697,918

6 Claims. (Cl. 171—118)

This invention relates to control systems for alternating current motors, and more particularly to field control for synchronous machines. The field excitation is supplied by a novel type of rectification, a characteristic of this type of rectifier being utilized to control the flow of D. C. to the motor field, and the system may be designed to include either single or polyphase rectifiers.

One object of this invention is to insure automatically that the machine has reached substantially synchronous running speed before the D. C. field excitation is applied to the field winding.

Another important object is to provide a method of automatically controlling synchronous motors from either an adjacent or a remote point, by which pushbuttons or like simple devices are the only mechanisms required at the control station.

Another object of this invention is to improve the starting characteristics of synchronous machines by automatically withholding the D. C. field current until the machine is in approximate synchronism.

A further object is to automatically discontinue the field excitation when the machine falls out of synchronism due to overload, voltage dip, or any other reason, until such time as the rotor of the machine again attains substantially synchronous speed.

Still a further object is to provide a field control system that is positive in action, easily maintained, and free of time delay relays and like mechanical apparatus formerly used.

Other objects of this invention will appear from the following description when read in connection with the diagrams shown.

One particular type of rectifier tube here utilized to supply D. C. field current is generally designated under the trade name "Thyratron." These are special purpose, heavy current gas tubes, the action of which may be instituted by applying a definite potential upon a control grid. For any given plate voltage there is a definite grid voltage at which ionization will occur, known as the trigger point. At this point the tube begins to pass current. Unlike the usual thermionic vacuum tube, once ionization has started the grid has no further control until the anode potential is lowered sufficiently to stop ionization. The operation of this device consists in periodically removing the anode voltage, such as occurs when an alternating current wave goes through zero point, thus stopping ionization and controlling its recurrence by controlling the potential applied upon the grid. Therefore once in each cycle of alternation the grid regains control and can delay ionization and consequent current output, as long as it remains more negative than the beforementioned trigger point. It is this last mentioned characteristic, namely controlling tube current output by means of grid potential, that is utilized in the embodiment of this present invention shown in the accompanying diagrams, in which Fig. 1 is a diagrammatic view of an embodiment of this invention showing a type of excitation control using space discharge tubes for controlling the application of field current to an alternating current synchronous motor.

Figure 2:
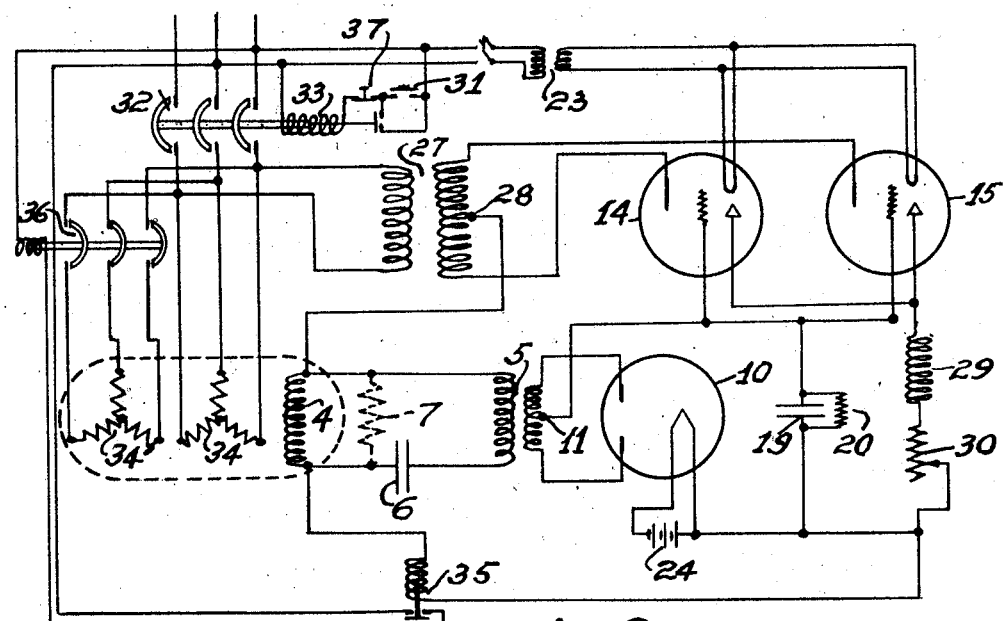

Fig. 2 is a diagrammatic view showing the application of this system of field current control to a two winding stator machine, and is arranged for remote automatic control.

Referring to Fig. 1 of the drawing in more detail, the embodiment of this invention there shown comprises a synchronous motor 1, having its stator or armature winding 2 connected to a three phase A. C. supply circuit through switch 3, and having a field winding 4. The primary of a transformer 5 and a condenser 6 are connected in series across the terminals of field winding 4, which may have a resistance 7 connected across it in parallel or a resistance may be substituted for the condenser 6. The secondary winding of transformer 5 has its ends connected to the anodes 8 and 9 respectively, of a full wave rectifier tube 10. The mid-tap 11 of the secondary winding is connected to the control grids 12 and 13 of the above described main rectifier tubes 14 and 15. The cathode 16 of tube 10 is connected to cathodes 17 and 18 of main rectifier tubes 14 and 15, which are arranged to provide full wave rectification. A condenser 19 and a parallel resistance 20 are connected across the grids 12 and 13, and the cathodes 17 and 18 of the main rectifier tubes 14 and 15. The cathode heating elements 21 and 22 of rectifier tubes 14 and 15 may be supplied with current by a filament transformer 23 connected across the A. C. power line, or by any other suitable method such as a battery 24 which is shown as the current supply for filament 16 of tube 10. The main rectifier tubes 14 and 15 have their respective anodes 25 and 26 connected to the ends of the secondary winding of transformer 27. The mid-tap 28 of this secondary winding is connected through a suitable inductance 29 and rheostat 30 to one terminal of the motor field winding 4. The other field terminal is connected to cathodes 17 and 18 respectively of the main rectifier tubes 14 and 15.

The operation of this invention as applied to the starting of a synchronous motor as an induction motor is as follows:

When a machine of this type is started, as by closing switch 3, current flows in the stator windings 2 and the rotor begins to revolve. If the excitation current is flowing through the field winding at this moment, considerable interference with the starting occurs. In this invention the field excitation current is withheld by automatic means until the machine has attained substantial synchronism as will now be stated in detail.

When the rotor starts, a voltage of slip frequency is induced in the field winding 4 and drops both in potential and frequency as synchronism is approached. Condenser 6 blocks any direct current, but allows the alternating slip frequency current to flow through the primary winding of transformer 5. A corresponding voltage is thus generated in the secondary winding and after being rectified by the full wave rectifier 10, passes through to charge the condenser 19 and impress a negative voltage on the grids 12 and 13 of the main rectifier tubes 14 and 15. This negative bias or potential on the grids prevents the tubes from ionizing and so passing current until the value of this biasing potential is reduced to a definite value, as was earlier set forth in the description of these tubes.

As the rotor of the machine approaches synchronous speed, the induced slip voltage in the field winding 4 drops, causing a lessened output from rectifier 10, and reducing the negative bias on the grids 12 and 13 of the main rectifier tubes 14 and 15. Gradually this biasing voltage falls to a low point and when substantial synchronism is reached, the critical or trigger point potential is passed and the main rectifier 14 and 15 ionize and begin supplying D. C. to the field winding 4.

If the machine falls out of synchronism due to overload, voltage dip, or other cause, a slip voltage will be induced in the field winding which will result in a negative bias on the rectifier grids 12 and 13, as before described. The main rectifiers 14 and 15 will cease to supply D. C. to the motor field as long as this negative bias is above the trigger point. As the rotor again comes up to synchronous speed, the induced slip voltage falls, causing a less negative potential on control grids 12 and 13, until the trigger point is passed whereupon the main rectifiers ionize and begin passing field excitation current once more.

The inductance 29 is inserted in the field circuit for the purpose of further smoothing the pulsating D. C. furnished by the main rectifiers, although it is not essential to the operation of this invention.

Referring now to Fig. 2 of the drawing, there is shown a modification of the present invention as applied to a two winding stator of a synchronous machine arranged for remote automatic control. When the switch 31 is closed, the contactor 32 is operated by its solenoid winding 33, closing the A. C. circuit and applying current to the winding 34 of the synchronous motor, and to the transformer 27. The rotor starts and when it has attained substantially synchronous speed, the field current is automatically supplied by the rectifiers 14 and 15 in the manner previously described. The flow of D. C. field current energizes relay 35, and closes the circuit which supplies current to the solenoid winding of contactor 36, which then closes and connects the second stator winding 34' of the synchronous machine to the A. C. supply line. Upon operation of the stopping switch 37, the solenoid 33 of contactor 32 is deenergized, thus opening the A. C. supply line and shutting down the machine. The automatic field excitation control performs the same functions and in the same manner as disclosed in the embodiment of the invention shown in Fig. 1.

Although full wave rectification is shown, a suitable type of half wave rectification might be employed without deviating from the inventive idea here disclosed and the system is applicable to either single or polyphase A. C. current supply.

While I have shown and described my invention as applied to a particular system and as embodying various devices diagrammatically indicated, changes and modifications will be obvious to those skilled in the art and my object is, therefore, to cover all such changes and modifications as fall within the true spirit and scope of my invention.

What I claim as new and desire to secure by Letters Patent of the United States is:

1. In an alternating current motor control system, a power source, a motor having a field winding and a plurality of armature windings, means for supplying power to said field winding only at periods when said motor is running in substantial synchronism, connecting means operating irrespective of frequency associated with the field circuit of said motor for maintaining the circuit between said power source and one of said armature windings only while said motor is operating at substantially synchronous speed.

2. In an alternating current motor control system, a power source, a motor having a field winding and a plurality of armature windings, means for supplying power to said field winding only at periods when said motor is running in substantial synchronism, a relay operating irrespective of frequency associated with the field circuit of said motor for maintaining the circuit between said power source and one of said armature windings only while said motor is operating at substantially synchronous speed.

3. In an alternating current motor control system, a motor having a field winding and a plurality of armature windings, means for applying power to the armature windings and for exciting the field winding, thermionic rectifying means for supplying D. C. field excitation, means for discontinuing the supply of field excitation when said motor falls out of synchronism, and a relay connected between said field winding and said rectifying means, said relay controlling the energizing circuit of one of said armature windings.

4. In an alternating current motor control system, a power source, a motor having a field winding and a plurality of armature windings, means for applying power to the armature windings and for exciting the field winding, and means in the field circuit for maintaining excitation current only while said motor operates in substantial synchronism and means responsive to current flow in said field circuit for closing and opening a circuit between said power source and one of said armature windings.

5. In a synchronous motor control system, the combination of a motor having an armature winding and a field winding, means for applying power to said armature winding, means for exciting said field winding, a transformer having a primary winding included in a circuit containing said field winding and a capacity, a secondary winding on said transformer, a rectifier energized from said secondary winding, and means including said rectifier for controlling said field excitation means in response to slip voltage in said field winding.

6. In a synchronous motor control system, the combination of a motor having an armature winding and a field winding, means for applying power to said armature winding, thermionic means for exciting said field winding, a transformer having a primary winding included in a circuit containing said field winding and a capacity, a secondary winding on said transformer, a rectifier energized from said secondary winding, and means including said rectifier for controlling said field excitation means in response to slip voltage in said field winding.

JOSEPH ARTHUR BALMFORD.